Sept. 29, 1970  R. W. POSEGATE  3,530,531
APPARATUS FOR PREPARING POULTRY LOAF PRODUCT
Filed Jan. 23, 1968  3 Sheets-Sheet 1
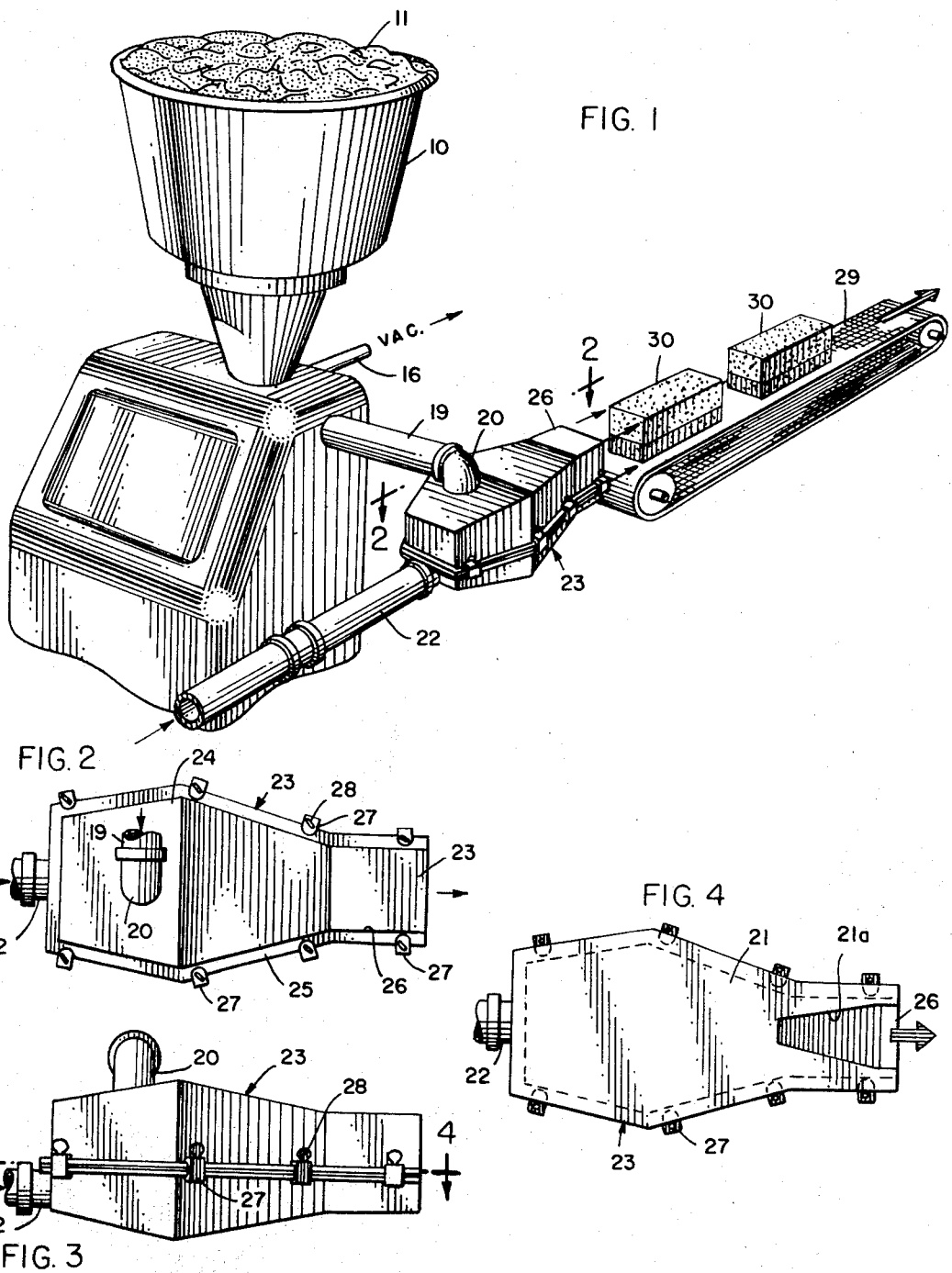
INVENTOR:
RUSSELL W. POSEGATE
BY:
Carl C. Batz
ATT'Y Sept. 29, 1970  R. W. POSEGATE  3,530,531
APPARATUS FOR PREPARING POULTRY LOAF PRODUCT
Filed Jan. 23, 1968  3 Sheets-Sheet 2
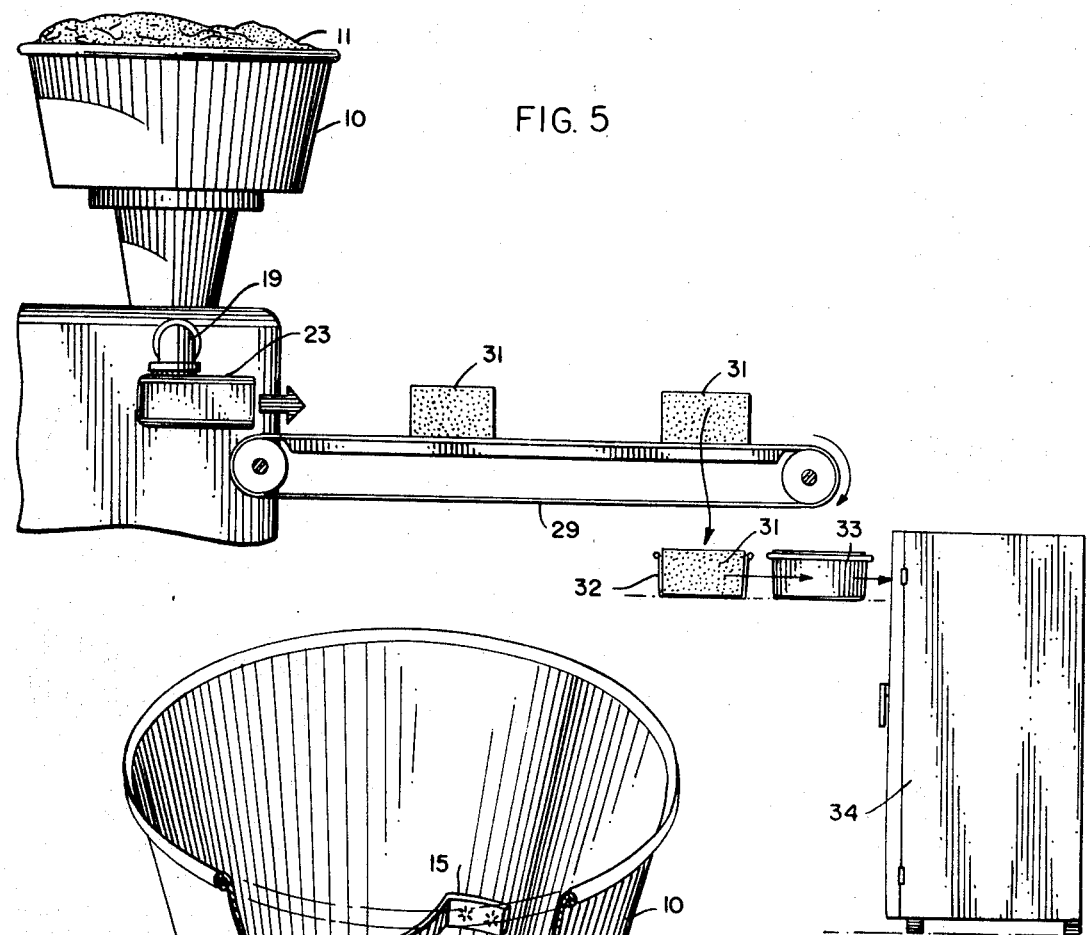
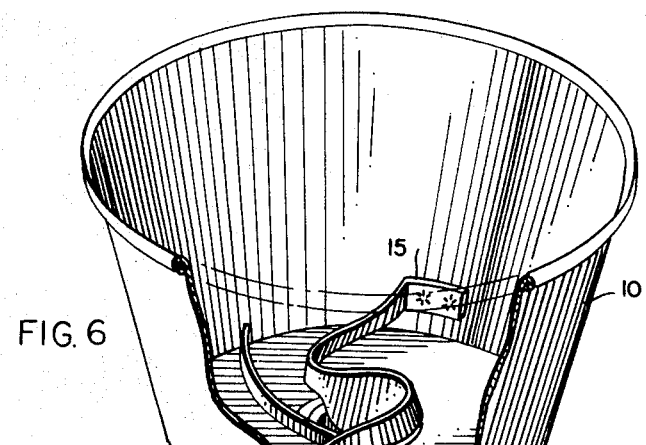
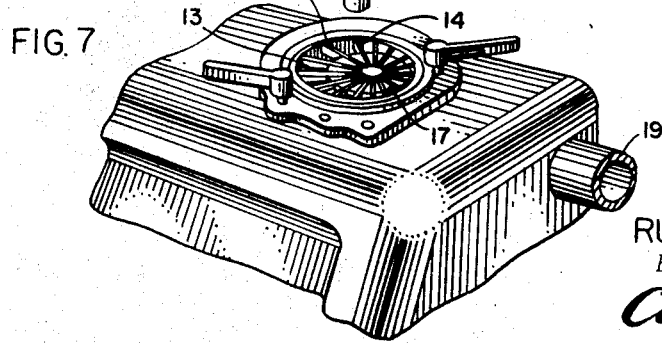
INVENTOR:
RUSSELL W. POSEGATE
BY
Carl C. Batz
ATT'Y Sept. 29, 1970 R. W. POSEGATE 3,530,531
APPARATUS FOR PREPARING POULTRY LOAF PRODUCT
Filed Jan. 23, 1968 3 Sheets-Sheet 3
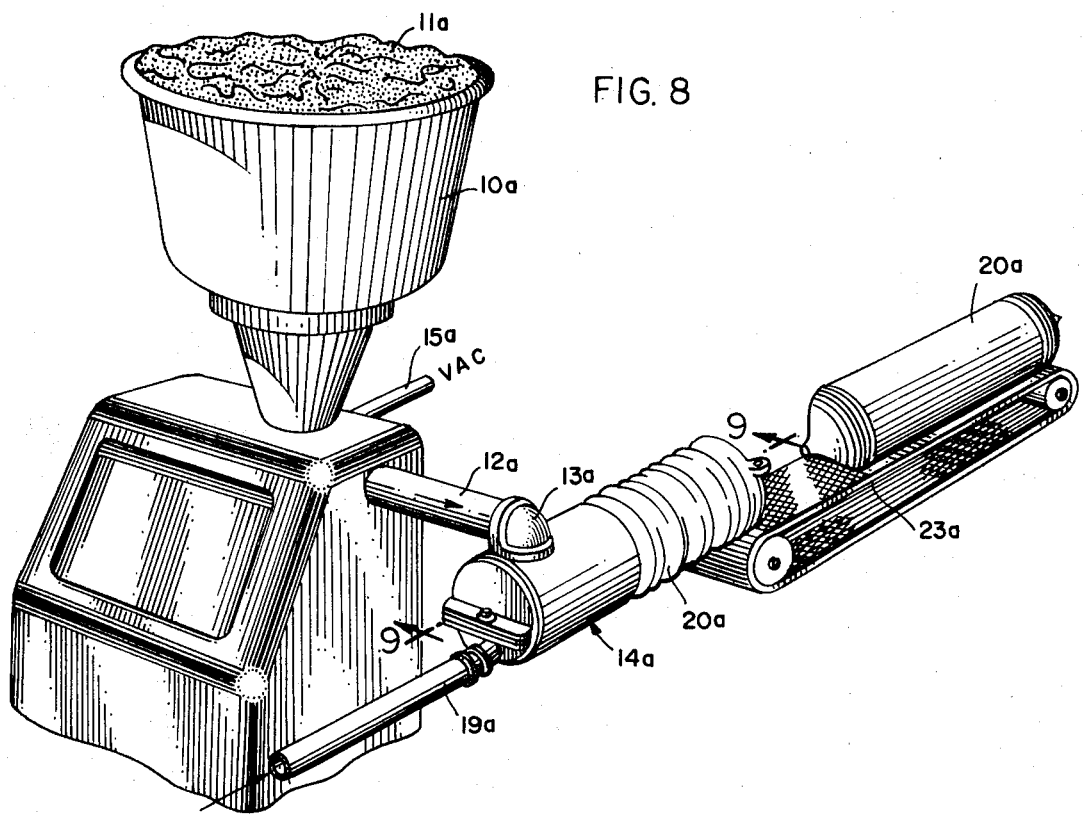
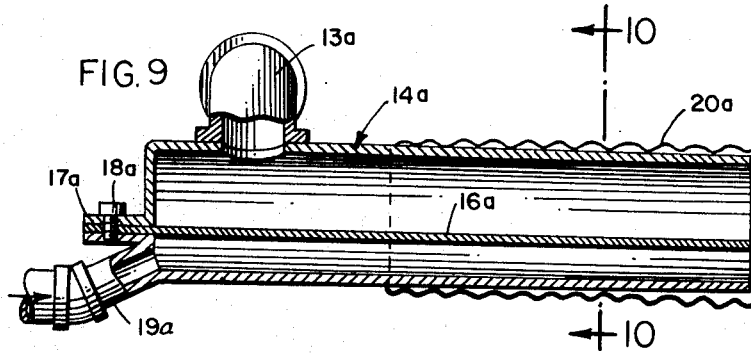
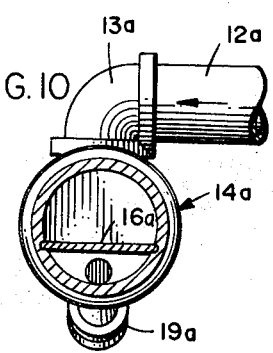
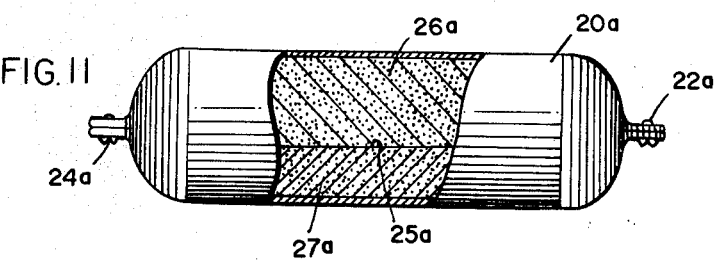
INVENTOR:
RUSSELL W. POSEGATE
BY
Carl C. Batz
ATT'Y

United States Patent Office 3,530,531
Patented Sept. 29, 1970

3,530,531
APPARATUS FOR PREPARING POULTRY LOAF PRODUCT
Russell W. Posegate, La Grange Park, Ill., assignor to Armour and Company, Chicago, Ill., a corporation of Delaware
Continuation-in-part of applications Ser. No. 618,588 and Ser. No. 618,729, both filed Feb. 27, 1967. This application Jan. 23, 1968, Ser. No. 699,826
Int. Cl. A22c 7/00
U.S. Cl. 17—32        9 Claims

ABSTRACT OF THE DISCLOSURE

Raw poultry pieces, which have been treated with an edible metallic salt and agitated to extract a salt-soluble coating or binder on the pieces, are extruded through a nozzle to unite the pieces and discharge them in the form of a shape-sustaining loaf onto an open support. The nozzle or extruding chamber may be divided, white meat being fed to one section at the side of the divider and dark meat pieces fed to the other section, and the two meat bodies being brought together in the nozzle or chamber to unite them in a single loaf or in an elongated body which may be sawed or cut to form separate loaves for enclosure in containers. In another embodiment, a cellulosic casing closed at its outer end is drawn over an extrusion nozzle or pipe having a longitudinal divider plate therein to bring the closed end of the casing adjacent the discharge end of the pipe. The coated white and dark meat pieces are passed under pressure through the pipe, with the dark meat on one side of the divider plate and the white meat on the other side of the plate, to advance the casing and fill it with a measured amount of meat. The rear end of the casing is then gathered and closed.

RELATED APPLICATIONS

This application is a continuation in part of my copending application Ser. No. 618,729, filed Feb. 27, 1967 now U.S. Pat. No. 3,416,931, and my co-pending application Ser. No. 618,588, filed Feb. 27, 1967, now abandoned.

BACKGROUND AND SUMMARY

In prior practice, elongated raw meat pieces have been cut from poultry and extracted with a metallic salt at low temperatures to provide a salt-soluble protein adhesive coating the pieces and which can bind the pieces together when the pieces are pressed into contact. The loaf may consist of white meat alone or dark meat alone, but the product is especially attractive when the loaf is formed with a white meat section and a dark meat section united thereto, one above the other. In forming the loaf in one body or in two sections, a problem is encountered in bringing the meat pieces together into a sturdy loaf which will not separate and in which the pieces are united in horizontal alignment so that the grain of the meat in the loaf runs in a horizontal direction so that the slice can be crosswise to the grain, giving a better and more tender slice.

In the prior practice, the elongated meat pieces have been laid by hand in a container, but this is a laborious and expensive operation and air pockets are formed in the loaf product. Further, to meet the problem, the elongated pieces after being arranged by hand in parallel arrangement have been pressed by a paddle through a stuffer and into a plastic sheath or tube. Here, however, the elongated pieces have been pressed laterally out of horizontal alignment and the final product has air pockets or voids therein. Further, when the loaf consists of a white meat section superposed over a dark meat section, it is found that the two sections become mixed in the final package and with portions of the dark meat extending upwardly almost to the top of the white meat section.

I have discovered that a uniform product can be prepared with a minimum of expense, substantially free of voids, and having as much as 90–100 percent of the elongated meat pieces in horizontal alignment. By preparing the meat pieces through the application of an edible metallic salt and under agitation to provide an adhesive binder coating of salt-soluble protein on the pieces, and by passing the mass under pressure and vacuum into an extruding chamber, I find that the elongated pieces orient themselves rapidly and may be discharged through the extrusion nozzle of the chamber onto an open receiving surface to provide a shape-retaining loaf. In practice, the loaf may be elongated and may be cut to form unit loaves of the desired size. Further, in such extrusion, a divider may be employed to separate dark meat from light meat while bringing the two bodies together in the extrusion nozzle for uniting the same into a loaf having a relatively straight line of division between the light and dark meat sections.

By providing the extrusion chamber with forwardly- and inwardly-tapering sides leading to the extrusion nozzle, the orientation of the elongated pieces into the horizontal plane is facilitated, while at the same time the extruded body may be formed by a suitable nozzle into shapes which are polygonal, rectangular, or square in cross section, or in any other desired shape.

A further problem has existed with respect to extruding light and dark meat into a casing so as to provide a product in which there are separate white and dark meat layers united along an even line.

Heretofore poultry pieces of light and dark meat have been placed by hand in containers so as to separate the product into white and dark meat layers. However, in this practice, the pieces are unavoidably exposed, and in the finished product air pockets or voids occur. Further, the operation is laborious and expensive. Attempts have been made to push the assembled pieces consisting, for example, of while meat pieces, over a section of dark meat pieces, utilizing a paddle or pusher to move the material into a casing. However, this operation has been unsatisfactory because the pieces buckle and are dislocated, leaving in the cellulose casing a substantial amount of dark meat protruding into the white meat layer, and further causing the elongated poultry pieces to buckle and turn away from horizontal positions in the casing.

In my process, an extrusion pipe is employed, the pipe having a divider plate extending longitudinally thereof, and the dark meat pieces being passed under one side of the plate and the white meat pieces along the other side of the plate, and the meat is discharged into a cellulosic casing closed at its outer end and being drawn over the pipe in pleats or folds to bring the closed end of the casing adjacent the discharge end of the casing. Further, the poultry pieces are delivered to the pipe under pressure and vacuum. For an effective vacuum, the white meat pieces and the dark meat pieces are placed within a vat which forms an air seal, and the meat is fed below the seal to an impeller chamber which is under vacuum, and from the impeller chamber the meat is passed directly to the extrusion pipe. After filling the casing with a measured amount of the dark and white meat pieces and closing the inner end of the casing, the casing is cooked, in hot water, in an oven or any other suitable heating means. The cooked product comprises a white meat section with the pieces thereof integrated into a solid, continuous body, and a dark meat section having the pieces thereof similarly integrated, the two sections being integrated by a coagulated salt-soluble protein coating therebetween, preferably along a generally even horizontal line.

DESCRIPTION OF THE DRAWINGS

In the drawings, FIG. 1 is a broken perspective view of apparatus which may be employed in the use of my invention; FIG. 2, a longitudinal sectional view of the extruder chamber, the section being taken as indicated at line 2—2 of FIG. 1; FIG. 3, a side view in elevation of the structure shown in FIG. 2; FIG. 4, a longitudinal sectional view along the line of the divider plate, the section being taken as indicated at line 4—4 of FIG. 3; FIG. 5, a side view in elevation of the apparatus shown in FIG. 1 but with the divider plate removed for forming a unitary type of poultry meat loaf; FIG. 6, a broken perspective view of a portion of the apparatus employed for receiving the elongated poultry slices and for forming an air seal above the propeller apparatus; FIG. 7, a broken perspective view of the propeller apparatus for directing the meat pieces into the extruder chamber; FIG. 8, a broken perspective view of apparatus which may be employed in the practice of my invention for filling a cellulosic container with white and dark meat in adjoining sections; FIG. 9, a broken sectional view, the section being taken as indicated at line 9—9 of FIG. 8; FIG. 10, a transverse sectional view, the section being taken as indicated at line 10—10 of FIG. 9; and FIG. 11, a side view in elevation of the finished product, a portion of the casing being removed to show the meat structure in section.

DETAILED DESCRIPTION

In the apparatus shown in FIGS 1–7 of the drawings, 10 designates a container or hopper adapted to receive elongated poultry meat slices indicated by the numeral 11. The slices form an air seal above the discharge pipe 12 leading from the lower portion of the receptacle 10 and discharging into the outer free working space 13 of the impeller 14. A feeder blade 15 is mounted within the lower portion of the container 10 for feeding the meat pieces downwardly through the pipe outlet 12 and is rotated by a power shaft driven by motor means (not shown). As shown best in FIG. 1, a vacuum pipe 16 leads into the area above the impeller 14 and to a suitable source of suction for maintaining the impeller area under vacuum.

The impeller 14 may be of any suitable construction. I prefer to employ an impeller of the type shown in which a central hub 17 is provided with slots into which blades 18 may move inwardly and outwardly on inner blades stems and in telescoping relation therewith through the chamber 11 in which the hub 17 is eccentrically mounted. The outer ends of the telescoping blades 18 are provided with hooks engaging a channel within the impeller chamber so that as the hub rotates, the blades 18 move inwardly and outwardly and, when extended, propel the meat mass received from pipe 12 toward the outlet pipe 19 leading from the propeller chamber. Since such structure is well known, a further detailed description herein is believed unnecessary.

In the specific illustration given in FIGS. 1–4, the meat from container 10, which is prefarably white meat, is discharged through a downwardly-turned end member 20 into the upper section of an extrusion chamber which is provided with a longitudinally-extending divider plate 21. Dark meat is discharged through a pipe 22 leading from apparatus similar to that shown and described above as consisting of a container 10, impeller 14, etc., into the lower portion of the extruder 23 below the divider plate 21.

In the illustration given, the extruder 23 has an enlarged central area 24 for receiving the meat pieces and forwardly-tapering sides 25 merging into an extrusion nozzle 26. The extruder 23 is formed in two parts, and between the two parts extends the divider 21. To unite the two parts, flanges 27 are provided having aligned threaded openings, and screw tabs 28 may be used to clamp the two flanged portions together.

In the operation of the process, the divider plate 21 may be secured in position as shown in FIGS. 1–4 and the white meat pieces fed by the rotary member 15 through pipe 12 into the spaces between the extended impeller blades 18, so that the pieces are than fed through the pipe 19 into the upper chamber of the extruder 23. Similarly, the dark meat pieces may be fed from apparatus similar to that described above but discharged through pipe 22 into the lower chamber of the extruder 23 below the divider plate 21, and the two bodies may be brought together under pressure and discharged through the nozzle 26 onto a continuous conveyor 29 or any suitable open receiving surface. In the illustration given in FIG. 1, the meat loaf 30 formed of an upper section of light (white) meat and a lower section of dark meat is formed by cutting the elongated extruded body into the loaf sections illustrated.

If desired, the divider plate 21 may be omitted and the extruder 23 employed for extruding onto the conveyor 29 a unitary loaf 31 formed of light meat only, or, if desired, dark meat only. As above described, the discharged body from the extruder is an elongated ribbon or loaf body which may be severed by a saw or knife to form the separate loaf 31, and the loaf 31 may then be introduced into a container 32, preferably formed of aluminum, or other suitable container in which the raw product may be later cooked. After placing the extruded loaf 31 into the container, a closure 33 may be pressed in place and the product then passed into a refrigerator 34 to chill the product to a freezing temperature for preserving it during shipment and sale and until the product is ready for cooking.

When the roast product is to be cooked, the container 32 with its closure 33 removed may be placed within the oven of a range and cooked to the desired temperature under aluminum foil.

The meat pieces may be treated in any suitable manner with the edible metallic salt for extracting the salt-soluble protein coating. The procedure is described in detail in U.S. Pat. No. 3,285,752. In the operation, the edible salt, which may consist of sodium chloride, potassium chloride, and various phosphates, may be employed in a concentration within the range of about 0.1 and 2.0 or 2.5 percent and the pieces agitated at a temperature within the range of 25–70° F. to bring about the desired salt-soluble binder coating. If desired, poultry skin and small poultry pieces, either separately or together, may be ground to form a paste and the paste incorporated with the elongated poultry pieces, the paste being incorporated preferably within the range of about 10–35 percent of paste based on the total weight of the mixture, all as described in detail in U.S. Pat. No. 3,285,753.

In the extrusion operation, sufficient pressure is employed for forcing the meat pieces into solid contact as they leave the extrusion nozzle so that the extruded loaf deposited on the conveyor 29 or other open surface is shape-retaining and, in fact, so firmly united that the pieces remain firmly knitted together during the sawing or separating operation. The cutting may be by knife, saw, shears, or other suitable severing device.

Any suitable feeder or stuffer device may be used to feed the meat pieces to the extruder 23.

In order to firmly unite the dark meat layer to the white meat layer, I prefer to cut away a portion of the divider plate at 21a, as shown more clearly in FIG. 4. The entire plate portion within the nozzle may be cut away, but I prefer a notched area, as shown in FIG. 4, because this brings the central portions of the white and dark meat bodies together first and the area of contact is gradually widened as the combined body moves forwardly. It is found that this arrangement is advantageous because the central portions of the dark and light meat bodies are united first under heavy pressure, and when the loaf is later discharged, a strong interior union is effected. Further, during the cooking operation, there is no tendency for the light and dark sections to separate in the central portions of the loaves.

In the illustration given in FIGS. 8–11 inclusive, 10a designates a vat or hopper into which the poultry pieces 11a may be placed in a sufficient quantity to provide an air seal. From the hopper 10a, meat is fed from below the top sealing portion downwardly into an impeller (not shown) and through a delivery pipe 12a and elbow 13a into the top of the extrusion pipe 14a. As indicated, a pipe 15a communicates with the impeller chamber and may lead to any suitable source of vacuum.

The extrusion pipe 14a is provided with a longitudinally-extending divider plate 16a. The divider plate may be placed at any desired position within the cylindrical casing 14a. In the specific illustration given, the divider plate is a little below center, since I prefer to have a larger amount of white meat pieces in the upper portion of the loaf and a smaller amount of dark meat pieces in the lower portion of the loaf. The divider plate may be supported in any suitable manner within pipe 14a. In the illustration given, flanges 17a are provided at the rear of the pipe, and a threaded screw 18a is used to clamp the plate between the flanges.

If it is desired to have a larger amount of the meat loaf comprised of white meat pieces, these may be fed through the pipe 12a and elbow 13a into the top of the pipe 14a and above the divider plate 16a. Dark meat pieces may be fed through apparatus substantially the same as that shown in FIG. 1 but through a pipe 19a into the lower side of the pipe 14a below the divider plate 16a. Since there is usually more white meat available than dark meat, the final loaf may contain generally about 60 percent of white meat and about 40 percent of dark meat, but this proportion may be changed widely depending upon the choice of the manufacturer. Also, it will be understood that the divider plate may extend in other longitudinal planes than in the horizontal plane indicated in FIGS. 9 and 10.

The feed or impeller means shown in FIG. 1 has certain advantages because of the effective sealing by means of the meat pieces against ingress of air and the effective feeding of the pieces under the vacuum into the extrusion pipe 14a. While such feeder apparatus has the advantages referred to, it will be understood that other feed mechanism may be employed which will supply the meat pieces under pressure and vacuum to the extrusion pipe 14a.

A suitable casing 20a for receiving the meat is drawn in folded or pleat form over the pipe 14a to bring the closed end 21a of the casing adjacent the discharge end of pipe 14a so that substantially no air is enclosed within the casing during the filling operation. The end 21b of the casing may be closed by any suitable means, such as a metal clip 22a, etc.

In the operation of the process and apparatus shown in FIGS. 8–11 inclusive, a measured amount of white meat pieces and dark meat pieces is fed through their respective pipes 12a and 19a into the pipe 14a and is discharged into the cellulosic casing 20a, pushing the casing forwardly as it fills the casing and until the proper amount of meat has been supplied to the casing. Preferably, the casing is discharged upon a conveyor 23a, but it may be discharged upon any suitable receiving surface. The inner end of the casing may then be gathered tightly around the meat body and the end of the casing closed with a clip 24a or other suitable fastening means, while the gathered excess portions of the casing are cut away. The encased product, as shown in FIG. 11, may then be cooked in any suitable manner. For example, it may be placed within a hot water cooker and cooked for the desired period of time at temperatures of about 150–190° F., and the cooking may be carried out at about 170° F. for a period of time corresponding to 25 minutes for each pound of product weight. The temperatures will vary widely depending upon whether the product is cooked in ovens or other cooking apparatus.

The process of preparing the poultry pieces for extracting the salt-soluble protein adhesive binder is fully described in U.S. Pat. No. 3,285,752. As pointed out in such patent, the edible metallic salt, such as sodium or potassium chloride, and the edible phosphate salts, such as sodium tripolyphosphate, may be applied to the pieces in a concentration of about 0.1–2.0 or 2.5 percent based on the weight of said poultry pieces and the pieces agitated at a temperature preferably within the range of about 25–70° F. An increased amount, above the range set out above, of the edible metallic salt may be applied by combining the phosphate salt with the sodium chloride.

A paste consisting of poultry skin with or without small poultry pieces, which are ground to form a fluid mass, may be added to the poultry pieces preferably in the range of about 10–35 percent of paste based on the total weight of the mixture. The process involving the addition of paste is described fully in U.S. Pat. No. 3,285,753 which together with Pat. No. 3,285,752 are incorporated herein by reference.

Specific examples illustrative of the invention may be set out as follows:

EXAMPLE I

Turkeys were slaughtered, dressed, and slush-ice chilled to a temperature of 35° F. The chilled turkeys were then boned, keeping the temperature of the meat below 50° F. during the entire procedure. The breast meat (light meat) was carefully removed by hand-boning and kept in a separate container. Dark meat was removed from the thigh portion of the leg and also kept in a separate container.

Five hundred pounds of white meat were placed in an Anco Vacuum Mixer and 7.5 pounds of sodium chloride were sprinkled evenly over the surface of the meat. The mixer was operated for 15 minutes, during which time the white meat became soft and pliable and covered with a creamy, sticky coating.

The dark meat was similarly treated, the mixing being carried on for about 18 minutes. Portions of the white meat were then introduced into the apparatus, as shown in the drawings, so as to substantially fill and seal the container 10, and similarly the dark meat was introduced into a container 10 of a companion apparatus to seal the top of the container. A vacuum was maintained on each impeller device and the machines were operated as described above, the meat being fed by the blade 15 through the pipe 12 and between the extended blades 18 of impeller 14 the meat being discharged into the extruder 23. Dark meat was fed through the lower section below the divider plate 21 and the white meat in the section above divider plate 21. The two bodies were brought together along the notched area 21a of FIG. 4 to form a strong central union between the bodies. The elongated extruded body was severed by a saw to form the loaves 30, as shown in FIG. 1. It was found by test that the white meat section had about 95 percent of the elongated meat pieces horizontally aligned in the parallel formation. The dark meat section consisted of smaller meat pieces and about 80 percent of these pieces were horizontally aligned. The loaves 30a remained intact during the sawing operation which separated them from the extruded long body and they were found to be free of voids.

The loaves were placed in containers 32a and sealed with covers 33a and the complete product chilled in a refrigerator 34a. Later the chilled package was placed in an oven and cooked at about 170° F. for a period of time corresponding to 25 minutes for each pound of product weight. The meat maintained the shape of the original loaf and, when sliced, gave a uniform area of white and dark meat integrated along a substantially straight line.

EXAMPLE II

The process was carried out substantially as described in Example I except that the divider plate of the extruder 23 was removed and only white meat was passed through the extruder 23. An elongated extruded loaf was formed which was then cut by saw into loaves 31. These were introduced into containers 32 and sealed with closures 33. Ninety percent of the elongated meat pieces were found to be horizontally aligned. The product after chilling was cooked, as described in Example I, with substantially the same results.

EXAMPLE III

Turkeys were slaughtered, chilled, and boned as described in Example I, the breast meat and dark meat being kept in separate containers. The white meat was chilled, mixed with salt, and agitated in an Anco Vacuum Mixer, as described in Example I. A batter was prepared by mixing 41 pounds of skin, 20 pounds of wing knobs, and 21 pounds of boneless scrap white meat, and the mixture was placed in a pre-chilled silent cutter along with 1.9 pounds of a salt and spice mixture containing 1.2 pounds of sodium chloride. The mixture was chopped for 5 minutes and the chopped batter chilled to 35° F. The batter was added to the white meat in the Anco Vacum Mixer in the proportion of 85 pounds of batter to 500 pounds of white meat. After the mixer had been operated on the white meat for 5 minutes and after the adding of the batter, the mixing was continued for an additional 15 minutes. A vacuum of 22 inches was maintained during the mixing operation.

The mixture was then transferred to the vessel 10 of the apparatus shown in the drawing in an amount to fill the container and seal the same. As described in Example I, the meat was fed by blade 15 through pipe 12 into the impeller between extended blades 18 while maintaining a vacuum of 22 inches on the impeller chamber, and the mixture was then forced through pipe 19 into the extruder 23 from which the divider plate 21 had been removed. The mixture was forced through the extruder nozzle 26 and onto the belt 29.

The extruded elongated body was cut into loaves 31 and were found to be free of voids. To determine the horizontal orientation of the pieces, each loaf or roast 31 was cut in pieces of 1½ to 2 inches in length, and the meat pieces carefully separated by hand. The examination showed 95–100 percent of the white meat pieces lying in a horizontal parallel plane. In contrast with other tests carried on with dark meat pieces which were smaller and thinner in size, it was found that the dark meat horizontal alignment was from 60 to about 95 percent.

The chilled loaves or roasts were cooked with the results described in Examples I and II.

EXAMPLE IV

The process was carried out as described in Example I except that a paste prepared by grinding poultry skin and small poultry pieces and treated as described in Example III was incorporated in the proportion of about 20 percent of the paste based on the total weight of the mixture. The white meat and the dark meat were discharged by the impeller apparatus 14 through pipe 19 into the extruder 23 having the divider plate 21 in position. The white and dark meat were discharged, forming an elongated loaf body which was then severed by a saw to form the roast loaves 30, as shown in FIG. 1. The loaves were free of voids, and the white meat had the elongated pieces horizontally aligned to the extent of 99 percent, while the dark meat pieces were horizontally aligned to the extent of 65 percent. The product was cooked as described in Example I and the pieces were found to be uniform and continuous and the line between dark and white meat was substantially straight.

EXAMPLE V

The process was carried out as described in Example III except that the batter from the silent cutter having an elevated temperature in the neighborhood of about 65° F. was added directly to the chilled meat in the Anco Vacuum Mixer.

EXAMPLE VI

Chickens were slaughtered and dressed and slush-ice chilled to a temperature of 35° F. and the chilled carcasses boned to collect dark and white meat separately in pieces. The pieces were processed as described in Example I and with substantially the same results.

While in the foregoing specification I have described the white meat layer as being above the dark meat layer, it will be understood that this order can be reversed, the layers being arranged in any desired relation.

It was surprising to find that the elongated pieces became oriented into longitudinal or parallel alignment, with 95–100 percent of the larger or white meat pieces being in alignment and with 60–90 percent of the dark meat pieces being longitudinally aligned, in view of our prior practice in which the pieces were laid in a two-part mold, open at both ends, and the pieces then pushed into a casing, with the result that the sticky pieces lost their longitudinal alignment and were twisted and curved in the package.

EXAMPLE VII

Turkeys were slaughtered, dressed, and chilled to a temperature of 35° F. Breast meat was removed and kept in a separate container, and dark meat was removed and kept in a separate container. Batches of the white meat and separate batches of the dark meat were mixed with sodium chloride, each in the proportion of 500 pounds of meat to 7.5 pounds of sodium chloride. The mass was agitated in an Anco Vacuum Mixer for about 15 minutes for the white meat and about 18 minutes for the dark meat. The dark meat preferably is tenderized by cutting the same with a tenderizing machine. After the mixing operation, the meat became soft and pliable and covered with a creamy, sticky coating. An impeller apparatus, as shown in FIG. 8 of the drawing and known as the Alpina machine, was employed and the container 10a filled and sealed with white meat. A similar or companion apparatus had its container filled with dark meat. A vacuum was maintained below the sealed container and the meat in each instance was fed to an impeller which delivered the meat under pressure to the extrusion pipe 14a. The white meat was delivered through pipe 12a to the space above the divider plate 16a, while the dark meat was delivered through pipe 19a to the space below the divider 16a. The extrusion of the meat caused the casing 20a to advance without exerting back pressure on the meat, and the upper and lower layers of meat were applied evenly within the casing as they advanced. After the casing 20a was filled, the inner ends of the casing were gathered and drawn tightly, the end being then closed and fastened with a clip 24a (Tipper tie clip). The filled product, as shown in FIG. 4, was then cooked within a hot water bath at a temperature of about 170° F. The product had a diameter of 5 inches and a length of 15 inches, and the casing was a regenerated cellulose casing. As shown in FIG. 4, the line 25a between the upper white meat 26a and the lower dark meat 27a was a substantially even horizontal line. A slice of the meat after cooking was found to be a smooth, even and unbroken slice, the white pieces being fully integrated and the dark pieces being also fully integrated, and also the sections 26a of white meat and 27a of dark meat being fully integrated along the line 25a.

EXAMPLE VIII

The process was carried out as described in Example VII except that there was added to the white and dark meat pieces a batter formed of skin and scrap white meat pieces. Four pounds of skin, 20 pounds of wing knobs, and 21 pounds of boneless scrap white meat, along with 1.2 pounds of sodium chloride were chopped for 5 minutes, and the chopped batter was added to the white meat which was being agitated in the Anco Vacuum Mixer, and similarly added to the dark meat being separately agitated in another Anco Vacuum Mixer. The mixing was carried on for about 15 minutes. The meat was fed to the pipe 14a under a vacuum of 22 inches. The results were substantially the same as those described in Example I.

EXAMPLE IX

Broiler chickens were slaughtered and dressed and slush-ice chilled to a temperature of 35° F. and the chilled broilers boned to collect dark and white meat separately in pieces. The pieces were processed as described in Example VII and filled into the casing 20a in the manner described in Example VII, the vacuum being 20 inches. The results were as described in Example I.

In the product, it was found by test that the elongated white meat pieces were aligned longitudinally in side-by-side relation as a result of using a positive pressure pump giving a constant extrusion in which the elongated pieces seemed to seek naturally the parallel aligned positions. This was in contrast with the practice heretofore in which the elongated pieces were placed by hand in a two-part mold open at its ends and the pieces then displaced using a paddle or plunger into the casing. The displaced pieces covered with the sticky coating tended to buckle and curl, with the result that the final product had the elongated pieces extending out of parallel. Tests showed that the elongated white meat pieces became aligned in the range of 95–100 percent while the dark meat pieces being shorter in length were aligned to the extent of about 60–90 percent. The advantage of alignment is that when the roll is later sliced transversely, the slice is more tender and palatable because the cutting is across the grain of the meat.

While in the foregoing specification I have set out specific structures and procedures for the purpose of illustrating embodiments of the invention in considerable detail, it will be understood that such details may be varied widely by those skilled in the art without departing from the spirit of my invention.

I claim:

1. In an extruder apparatus, an extrusion chamber having a divider plate extending longitudinally of said chamber to divide said chamber into separate longitudinal passages, said divider plate having a cut away portion extending rearwardly from the forward end of said divider plate and disposed inwardly of the edges of said divider plate between the sides of the discharge portion of said chamber, whereby, when layers of material pass forward through said separate longitudinal passages they are first contacted with each other between the edge portions thereof and later along the edge portions thereof.

2. The structure of claim 1 in which said cut away portion of the divider plate is generally V-shaped with the point of the V away from the forward end of the divider plate.

3. The structure of claim 1 in which said extrusion chamber has walls tapering forwardly and inwardly toward the discharge end of said chamber.

4. In an extruder apparatus, a casing divided longitudinally into separate upper and lower parts providing an extrusion chamber, said upper and lower parts having external side flanges, a divider plate extending longitudinally of said casing to provide separate longitudinal passages, said divider plate having a cut away portion extending rearwardly from the forward end of said divider plate and disposed inwardly of the edges of said divider plate between the sides of the discharge portion of said chamber, said divider plate also having edges extending between said external side flanges of said upper and lower casing parts, and means for releasably securing said upper and lower casing parts and said divider plate together.

5. The structure of claim 4 in which the means for releasably securing said casing parts and said divider plate extend through the external side flanges of said casing parts and through the edges of said divider plate.

6. The structure of claim 4 in which said casing parts and said divider plate form separate longitudinal passages of the same breadth but of different depth.

7. In an extruder apparatus, a casing divided longitudinally into separable parts providing an extrusion chamber, a divider plate extending longitudinally within said casing along the line of division of said separable casing parts and between said casing parts to provide separate longitudinal passages within said extrusion chamber which are free of obstruction to the flow of materials therethrough, and means for releasably securing said casing parts and said divider plate together.

8. In an extruder apparatus, a casing divided longitudinally into separable parts providing an extrusion chamber, said casing parts having external side flanges, said casing parts also having fastening means which engage said flanges, and a divider plate extending longitudinally within said casing along the line of division of said separable casing parts to provide separate longitudinal passages within said extrusion chamber which are free of obstruction to the flow of materials therethrough, said divider plate having edges extending between said external side flanges of said casing parts and held therebetween by said fastening means which engage said flanges.

9. In an extruder apparatus, a casing divided longitudinally into separable parts having angularly-related side walls forming an extrusion chamber which is enlarged at an intermediate area, a divider plate extending longitudinally within said casing having side edges extending between said side walls longitudinally of said casing, and means releasably securing said casing parts about said divider plate to close said extrusion chamber.

References Cited

UNITED STATES PATENTS

| 811,310 | 1/1906 | Maag | 249—167 X |
| 2,209,824 | 7/1940 | Louisot et al. | 17—32 |
| 3,082,682 | 3/1963 | Kaufman. | |
| 797,276 | 8/1905 | Glauser | 107—1.4 |
| 1,107,184 | 8/1914 | Priban | 17—35 |
| 2,650,551 | 9/1953 | Eckels et al. | 107—1.4 |
| 3,268,970 | 8/1966 | Kelly et al. | |
| 3,298,057 | 1/1967 | Liebmann et al. | 17—32 |

LUCIE H. LAUDENSLAGER, Primary Examiner

U.S. Cl. X.R.

17—35, 41; 18—13; 107—1; 249—163, 167